United States Patent
Srinivasan et al.

(10) Patent No.: US 8,180,277 B2
(45) Date of Patent: May 15, 2012

(54) SMARTPHONE FOR INTERACTIVE RADIO

(76) Inventors: Sudharshan Srinivasan, Fremont, CA (US); Jai Kumar, Cupertino, CA (US); Kothandraman Ramchandran, Fremont, CA (US)

(*) Notice: Subject to any disclaimer, the term of this patent is extended or adjusted under 35 U.S.C. 154(b) by 423 days.

(21) Appl. No.: 12/387,514

(22) Filed: May 4, 2009

(65) Prior Publication Data

US 2010/0279629 A1 Nov. 4, 2010

(51) Int. Cl.
*H04H 40/00* (2008.01)
*H04B 7/15* (2006.01)

(52) U.S. Cl. ........................ 455/3.06; 455/11.1
(58) Field of Classification Search ................... None
See application file for complete search history.

(56) References Cited

U.S. PATENT DOCUMENTS

| | | | | |
|---|---|---|---|---|
| 6,928,308 B2* | 8/2005 | Wang et al. | ................. | 455/569.2 |
| 7,343,141 B2* | 3/2008 | Ellis et al. | ..................... | 455/132 |
| 7,610,011 B2* | 10/2009 | Albrett | .......................... | 455/3.04 |
| 7,706,741 B2* | 4/2010 | Patel et al. | ................... | 455/3.05 |
| 2004/0038716 A1* | 2/2004 | Gass | .......................... | 455/569.1 |
| 2008/0214101 A1* | 9/2008 | Voto | .............................. | 455/3.02 |
| 2010/0150276 A1* | 6/2010 | Yew et al. | ..................... | 375/340 |

FOREIGN PATENT DOCUMENTS

JP 2008153958 A * 7/2008

* cited by examiner

*Primary Examiner* — Howard Williams

(57) ABSTRACT

A mobile device (31) capable of processing radio broadcast signals (36) is described. Broadcast radio signals (36) are received by said mobile device (31) and converted to desired digital audio content format (52) and then combined with output of software applications (54) running at said mobile device (31) to create a combined radio broadcast signal (55) that can be received by a automobile broadcast radio receiver (83). Said radio broadcast signal (55) is transmitted to a automobile broadcast radio receiver (83) to enable a user to interact with audio content using software applications (54) of said mobile device (31). Transmission of combined radio broadcast signal (56) is done on a different radio broadcast frequency with low power signal.

14 Claims, 20 Drawing Sheets

DETAILS OF SMARTPHONE DEVICE USED IN
INTERACTIVE RADIO SYSTEM

AUDIO CONTENT SHARING WITH GROUP OF USERS

AUTOMATIC RADIO CHANNEL SWITCHING BASED ON USER PREFERENCES

PLAY AUDIO BLOGS AUTOMATICALLY AFTER PROGRAM ENDING

ENABLE DIGITAL RADIO AND SATELLITE RADIO IN AN AUTOMOBILE

PURCHASE MUSIC RELATED TO BROADCAST AUDIO CONTENT

RECORD BROADCAST AUDIO CONTENT WITHOUT MISSING EARLY PARTS

SAVE BROADCAST AUDIO CONTENT AS RINGTONES FOR SMARTPHONE

RECEIVE COUPON BASED ON ADVERTISEMENT SELECTED

SMARTPHONE FOR INTERACTIVE RADIO

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of Invention

The present invention generally relates to interactive radio and specifically the use of smartphone software and hardware to enable interactive radio inside an automobile.

Radio listening in an automobile is currently a non interactive experience. This is because radio receivers that are installed in automobiles can only receive broadcast audio content from radio stations and play the content through a set of speakers in the automobile. Radio receivers do not provide the capability for users to interact with audio content.

Interactive radio enables listeners to interact with audio content being broadcasted. Interaction with audio content could be viewed as one of the several functionalities including, ability to copy desired content for later use, ability to use segments of content as bookmarks to enable lookup of stored content at a later time, ability to retrieve related information from servers based on segments of content, ability to setup communication channels with other listeners who have a common interest, ability to use segments of audio content to initiate electronic commerce activities and ability to use audio content as ring tones.

Audio content interaction can be provided using communication technology such as a cellular phone that can inter work with an automobile audio system. This may be achieved by using a cellular phone that is integrated with an automobile or a cellular phone that is separate from the automobile.

Integrated cellular phones suffer from several limitations. Some automobiles have integrated cellular phones that may be used to provide parts of the above mentioned interaction capabilities. But integration of cellular phones with automobiles has proven to be impractical as cellular phone technology has advanced at a much faster rate than the rate at which people replace their automobiles. People prefer using latest cellular phone technology when available, and having an integrated cellular phone with an automobile that uses an older cellular phone technology is not a preferred option. Hence it can be seen that most automobiles do not provide an integrated cellular phone as a standard option. So depending on an integrated cellular phone to provide audio interaction capability is not practical.

Other methods of inter working cellular phones with automobile audio systems to provide audio interaction also suffer from limitations. Some automobiles provide a bluetooth interface to cellular phones, but most bluetooth profiles only allow transferring content from cellular phones to the speakers of an automobile. There is no profile to transfer content from a radio broadcast that is received by a radio receiver in an automobile into the cellular phone so that software in the cellular phone can interact with broadcast audio content.

Some automobiles provide audio input capability to transfer content from cellular phones into the audio system of an automobile, but this is still a one way transfer and hence not sufficient to provide the above mentioned interaction as that would need access to the broadcast audio content.

In order to provide all of the above mentioned interaction capabilities, it is necessary to have a two way communication between an automobile system and a cellular phone. But such a requirement is not a part of any communication standard including Bluetooth and hence these would have to be implemented using proprietary mechanisms that will only serve a niche market.

Hence it can be seen that there is no solution that provides the above mentioned interactivity that leverages the latest cellular technology and works across all automobiles old and new.

Currently there are no known prior art methods that offer a solution to this problem.

Following paragraphs in current section describe relevant prior arts in this field.

Prior art U.S. Pat. No. 6,628,928 describes a system where a listener can ask for more information about audio content using an email. But this does not provide the ability to transfer information from the audio system into a cellular phone or enable a cellular phone to use its software on the audio content. Also, this prior art only provides a minimal form of asynchronous interaction and not real time interaction.

Prior art U.S. Pat. No. 7,280,079 describes a method to improve antenna efficiency to improve the receiver state. This does not address the above mentioned interaction capability.

Prior art U.S. Pat. No. 7,110,720 describes a method to receive digital information and transmit it using analog frequency modulated signal. But this does not address the needs of an interactive radio system that provides interactivity with broadcast audio content that is either analog or digital.

Prior art U.S. Pat. No. 6,928,308 describes a mobile phone that is able to detect which frequency modulated (FM) channel a radio receiver is tuned to. This is done by transmitting a signature signal repeatedly in multiple channels and listening to the audio and detecting the equivalent audio signature. This enables a cellular phone to automatically tune to a frequency that an automobile audio system is tuned to. But this does not address the needs of the above mentioned interactive radio system. This only provides a method where audio information may be transferred from a cellular phone into the automobile audio system but not the other way around.

Prior art US Doc 20080051918 describes a hardware chip design that provides an ability to receive and transmit radio signals using a single chip design. But this does not address the needs of an interactive radio system.

The company, Nokia describes a visual radio system where radio listening experience is enhanced using an alternative data feed that enables a user to see additional information related to the audio content that is being broadcast. But this does not address the problem of interactivity with audio content inside an automobile.

There are some mobile phones that offer receiving a frequency modulated signal (FM) and transmit FM signals. But the reception and transmission cannot be done simultaneously. Reception is used to hear broadcast music, and transmission is used to transmit stored digital audio content. For the above mentioned interactivity an ability to receive, enhance and retransmit the same signal is needed.

As can be seen from above, all known prior arts suffer from some limitations in offering a solution to address the need for an interactive radio system in an automobile.

3. Objects and Advantages

Accordingly, several objects and advantages of the present invention are:

a) to provide an interactive radio system that works in any automobile;
b) to provide an interactive radio system that enables a user to have access to broadcast audio content in a mobile phone and modify the content if necessary and then transfer such modified content from the mobile phone into the audio system of an automobile in real time; and
c) to provide an interactive radio system that enables use of mobile device software to interact with audio content.

SUMMARY

In accordance with present invention an interactive radio system is described that enables interaction with broadcast audio content inside an automobile while listening to broadcast audio content using the audio system of the automobile. This is achieved by providing a smartphone device that can receive and transmit radio signals simultaneously by placing a broadcast radio receiver and broadcast radio transmitter that can be operated simultaneously into the smartphone device.

Broadcast radio signals are received at the broadcast radio receiver, and contents of these signals are passed to software applications running at the mobile device, which optionally enhance the audio content and produce a combined signal to be transmitted. The combined signal is then transmitted using the radio transmitter embedded in the smartphone device at a different radio frequency so that it can be received by the audio system in an automobile. All of this is done in real time.

Currently there are no mobile phones in prior art that provide this capability to simultaneously receive and transmit radio signals. There are mobile phones that provide an ability to receive radio signals or transmit radio signals, but such devices are used purely to listen to over the air broadcasts or transmit audio content that is stored as digital audio content inside a mobile device. None of the devices known in prior art provide the ability to intercept radio broadcasts, modify the content as needed and retransmit the modified content in real time to be received by the audio system in an automobile.

DRAWINGS

Figures

DRAWINGS

Reference Numerals

Figure 1:
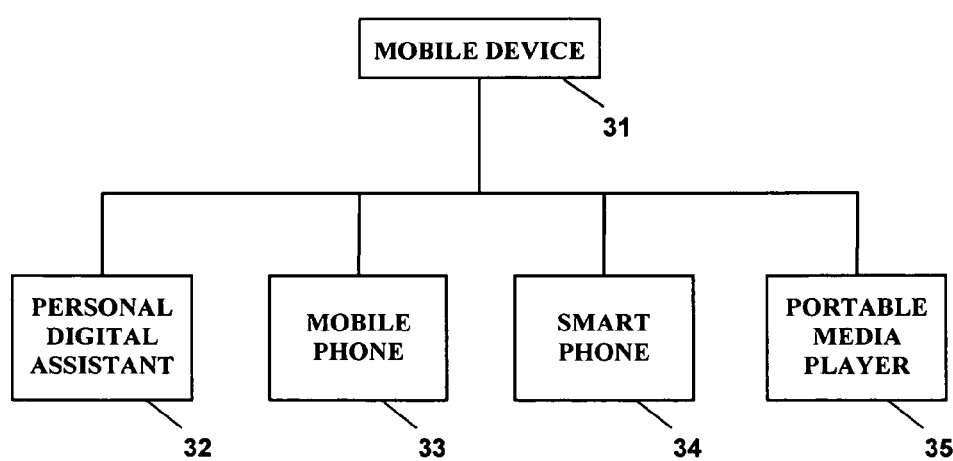
FIG. 1 shows a mobile device that can be one of personal digital assistant, mobile phone, smartphone and portable media player.

31 mobile device
32 personal digital assistant
33 mobile phone
34 smartphone
35 portable media player
36 broadcast radio signals
37 analog broadcast radio signals
38 digital broadcast radio signals
39 amplitude modulation standard
40 frequency modulation standard
41 high definition radio standard
42 digital audio broadcast standard
43 Interactive radio system
44 audio subsystem
45 applications processor
46 audio combining module
47 broadcast radio signal transmitter
48 software applications
49 broadcast radio input
50 broadcast radio signal receiver
51 digital audio content 52 digital audio content format
53 user
54 digital audio output of software applications
55 combined digital audio content
56 combined radio broadcast signal
57 automobile audio system
58 broadcast audio input antenna
59 digital audio converter
60 radio channel
61 audio input interface controller
62 random access memory unit
63 central processing unit
64 cellular modem
65 cellular antenna
66 cellular networks
67 power supply
68 global positioning receiver module
69 user input receiving module
70 step
71 step
72 step
73 step
74 step
75 step
76 step
77 step
78 step
79 step
80 step
81 broadcast radio station tower
82 portable radio
83 automobile radio broadcast receiver
84 voice chat rooms
85 voice chat room server
86 chat lists
87 chat room entries
88 chat room dialogs
89 user conversations
90 phone numbers
91 radio advertisement
92 beginning of time interval
93 end of time interval
94 time intervals
95 voice command
96 keypad button
97 record button
98 automatic speech recognition engine
99 audio representation
100 textual representation
101 circuit switched phone call
102 Voice over Internet Protocol (VoIP) call
103 internet
104 content server
105 internet browser
106 preference list
107 end of radio broadcast program
108 audio blogs
109 blog server
110 digital radio broadcast signals
111 satellite radio broadcast signals
112 satellite radio receiver
113 digital radio receiver
114 website of radio station
115 recording time intervals
116 advertisement server
117 coupon

DETAILED DESCRIPTION OF PREFERRED EMBODIMENT

In the following description, first a mobile device of present invention is described that is used to intercept broadcast radio signals to provide interactivity. Then the method used to intercept radio broadcast radio signals is described in further detail.

In addition several use cases are described that show different scenarios under which software applications in the mobile device of present invention are used to interact with contents of broadcast radio signals.

FIG. 1 shows a mobile device 31 that can be one of personal digital assistant 32, mobile phone 33, smartphone 34 and portable media player 35. Mobile device 31 is capable of receiving broadcast radio signals 36 and transmitting signals simultaneously in real time.

Figure 2:
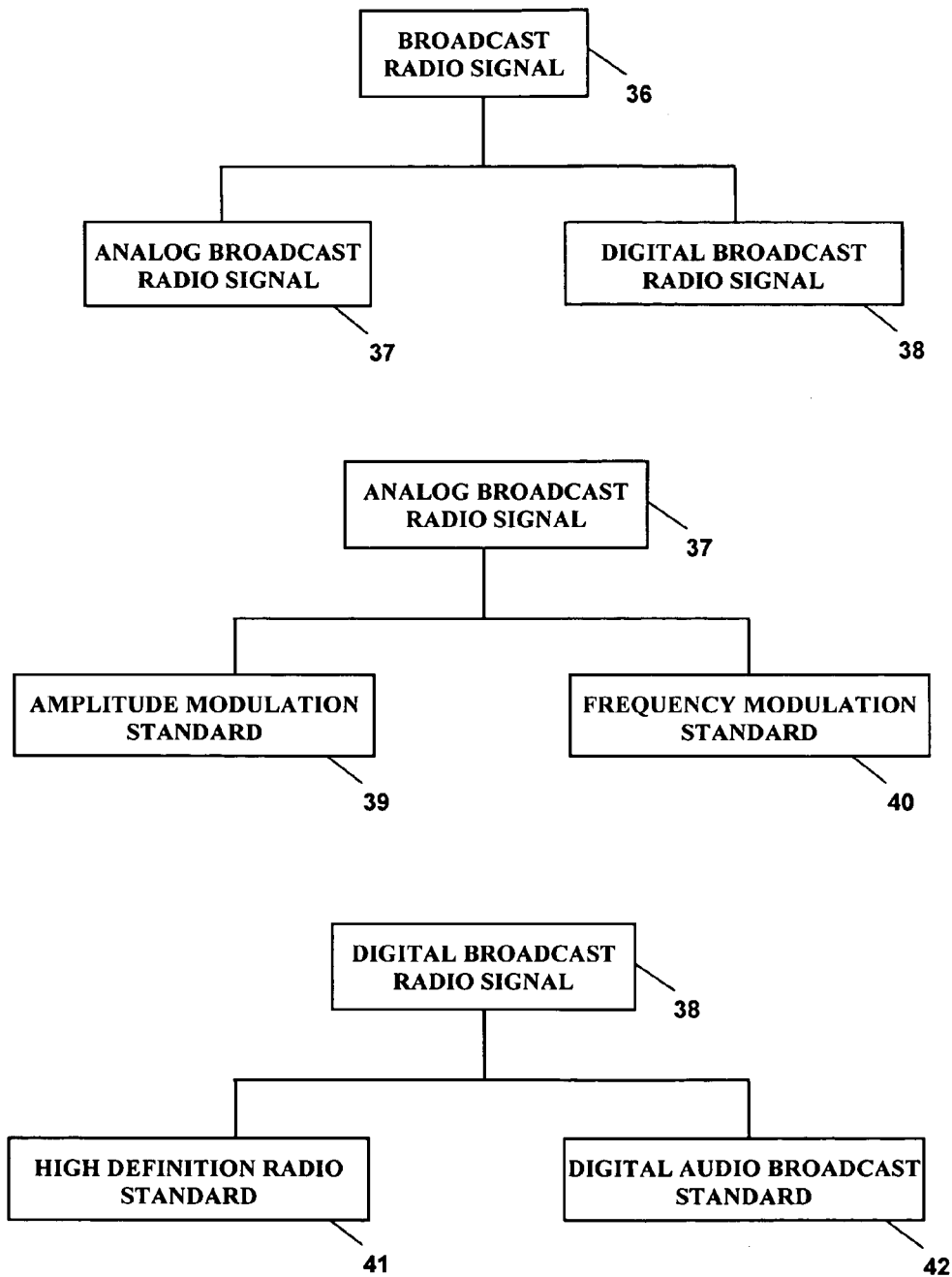
FIG. 2 shows a broadcast radio signal can be one of analog radio signal and digital radio signal.

FIG. 2 shows that broadcast radio signals 36 can be one of analog broadcast radio signals 37 or digital broadcast radio signals 38. Analog broadcast radio signals 37 are compatible with radio standards like amplitude modulation standard 39 and frequency modulation standard 40. Digital broadcast radio signals 38 are compatible with radio standards like high definition radio standard 41 and digital audio broadcast standard 42.

Figure 3:
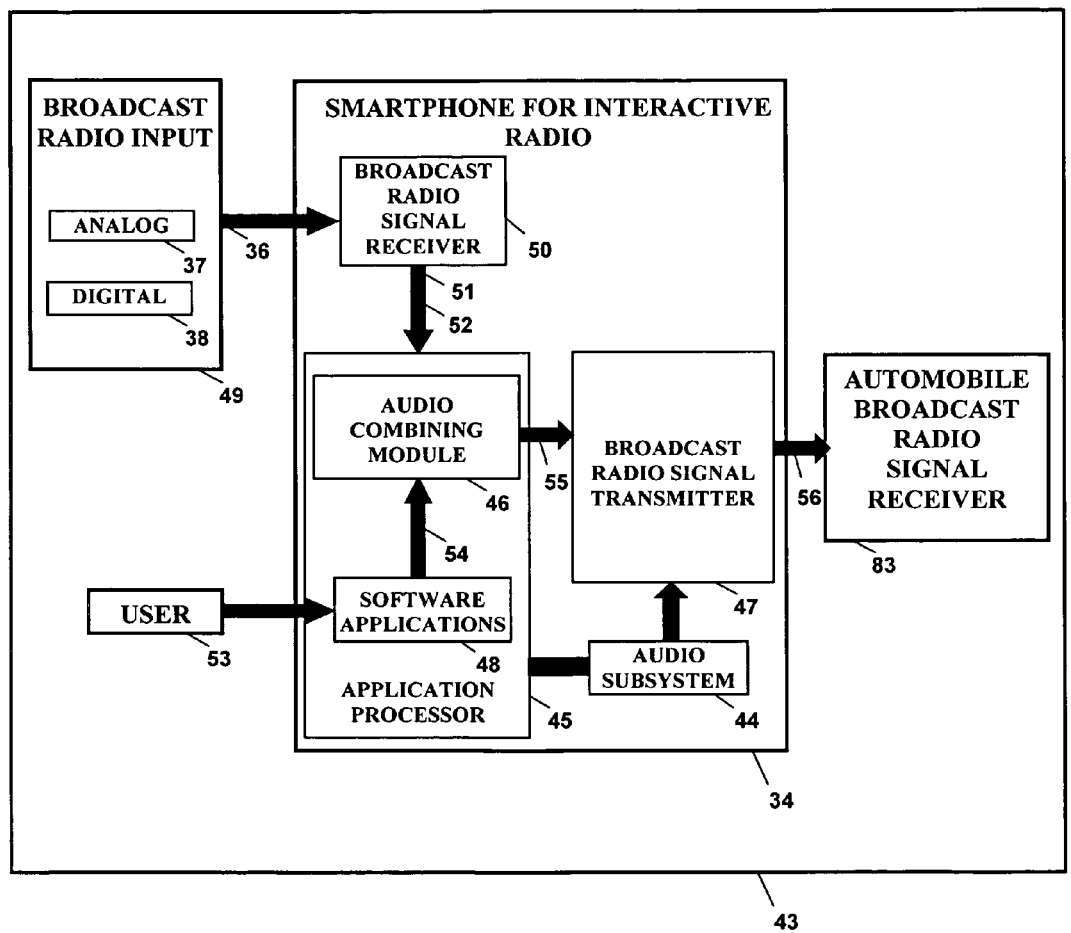
FIG. 3 shows a smartphone based interactive radio system.

FIG. 3 shows a block diagram of an interactive radio system using smartphone 34. Interactive radio system 43 consists of smartphone 34 that is made up of a audio subsystem 44, an applications processor 45, a audio combining module 46, a broadcast radio signal transmitter 47 and a set of software applications 48. Smartphone 34 receives as broadcast radio input 49 input broadcast radio signals 36 directly over the air using broadcast radio signal receiver 50.

Broadcast radio signals 36 are converted to digital audio content 51 in a digital audio content format 52 and then routed to audio combining module 46. Then a user 53 interacts with the software applications 48 on smartphone 34 to produce digital audio output of software applications 54. This output of software applications 54 is also sent to the audio combining module 46. Now digital audio content 51 in digital audio content format 52 is then combined with output of software applications 54 by audio combining module 46 to produce a combined digital audio content 55. Combined digital audio content 55 is then sent to the broadcast radio signal transmitter 47 to produce combined radio broadcast signal 56 that is then transmitted. Transmission of combined radio broadcast signal 56 is done on a different radio broadcast frequency with low power signal so that an automobile audio system 57 can pick up the combined radio broadcast signal 56 in real time.

Figure 4:
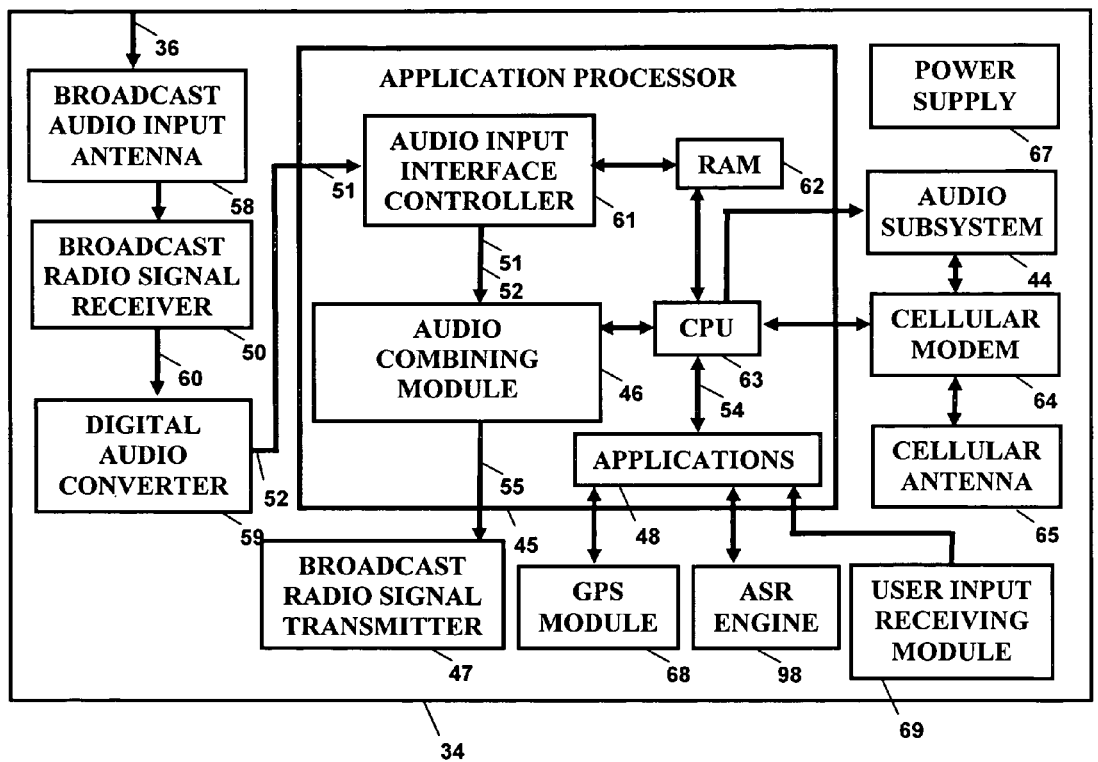
FIG. 4 shows details of a smartphone device used in an interactive radio system.

FIG. 4 shows further details of smartphone 34 used to intercept broadcast radio signals 36. It is made up of several components including a broadcast audio input antenna 58, a broadcast radio signal receiver 50 and a digital audio converter 59. Broadcast radio signals 36 are received at broadcast audio input antenna 58, then routed to broadcast radio signal receiver 50 that enables tuning to a particular radio channel 60 and then contents of tuned radio channel 60 are routed to digital audio converter 59 to produce digital audio content 51 in desired digital audio content format 52.

Smartphone 34 also has application processor 45 that consists of a audio input interface controller 61, audio combining module 46, a random access memory unit 62, a central processing unit 63 and software applications 48. Application processor 45 is also connected to audio subsystem 44, broadcast radio signal transmitter 47 and a cellular modem 64. Cellular modem 64 is connected to a cellular antenna 65 that is used to transmit and receive wireless signals over cellular networks 66. Smartphone 34 is powered by an internal power supply 67.

Application processor 45 is used to execute software applications 48 that interact with digital audio content of tuned radio channel 60 to produce output of software applications 54. Output of software applications 54 may include one or more of audio excerpts such as audio prompt for user input, internet based audio content related to audio content, audio information from phone applications executed in smartphone device 34 and global location information from embedded global positioning receiver module 68 in smartphone device 34. Another module user input receiving module 69 receives input from user 53 into software applications 48.

Output of software applications 54 is combined with digital audio content 51 in desired digital audio content format 52 by audio combining module 46 to produce combined digital audio content 55 that is sent to broadcast radio signal transmitter 47 for transmission. Transmission of combined radio broadcast signal 56 is done on a different radio broadcast frequency with low power signal.

Figure 5:
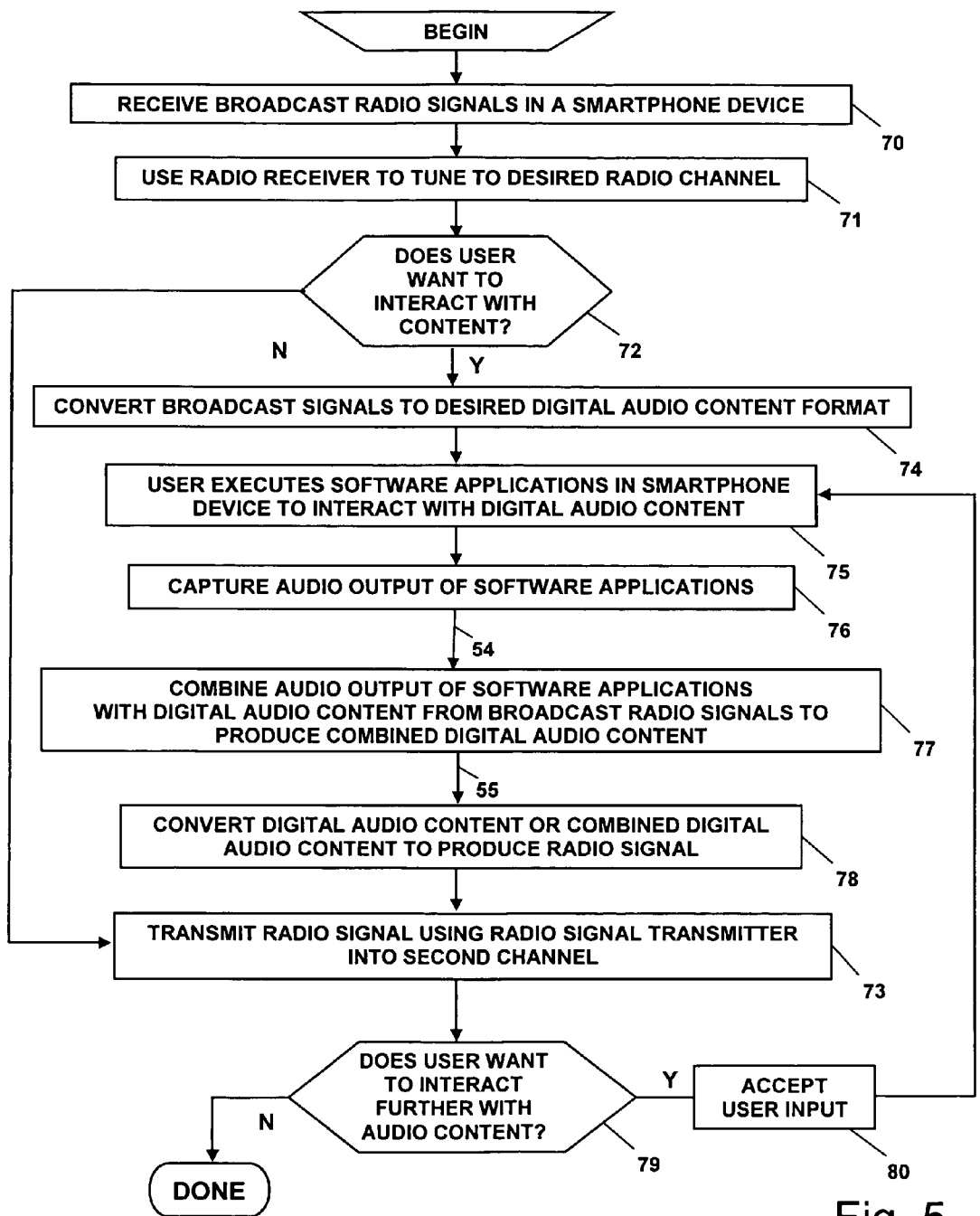
FIG. 5 shows a flow chart of a method where a radio broadcast signal is intercepted and combined with output of software applications executing at mobile device.

FIG. 5 shows a flow chart of the method that describes how a user can interact with interactive radio system 43 using smartphone 34.

In step 70 broadcast radio signals 36 are intercepted and received in smartphone 34. Then in step 71 broadcast radio signal receiver 50 is used to tune to desired radio channel 60.

In step 72 a check is made to see if user 53 wants to interact with content of tuned radio channel 60. If user 53 does not want to interact with content of tuned radio channel 60, then in step 73, radio signal is transmitted into second radio channel using broadcast radio signal transmitter 47.

In step 72 if user 53 wants to interact with content of radio channel 60 then in step 74 contents of radio channel 60 are converted to digital audio content 51 representing input radio signal in desired digital radio content format 52.

In step 75 user 53 executes software applications to enable desired interaction.

In step 76 audio output of software applications 54 is captured.

Then in step 77 captured audio output of software applications 54 is combined with digital audio content 51 to generate combined digital audio content 55.

In step 78 combined digital audio content 55 is then sent to the broadcast radio signal transmitter 47 to produce combined radio broadcast signal 56.

In step 73 combined digital audio content 55 is then transmitted using broadcast radio signal transmitter 47.

In step 79 if user 53 further wants to interact with tuned broadcast radio content, user input is accepted in step 80 and this method is repeated from step 75.

Figure 6:
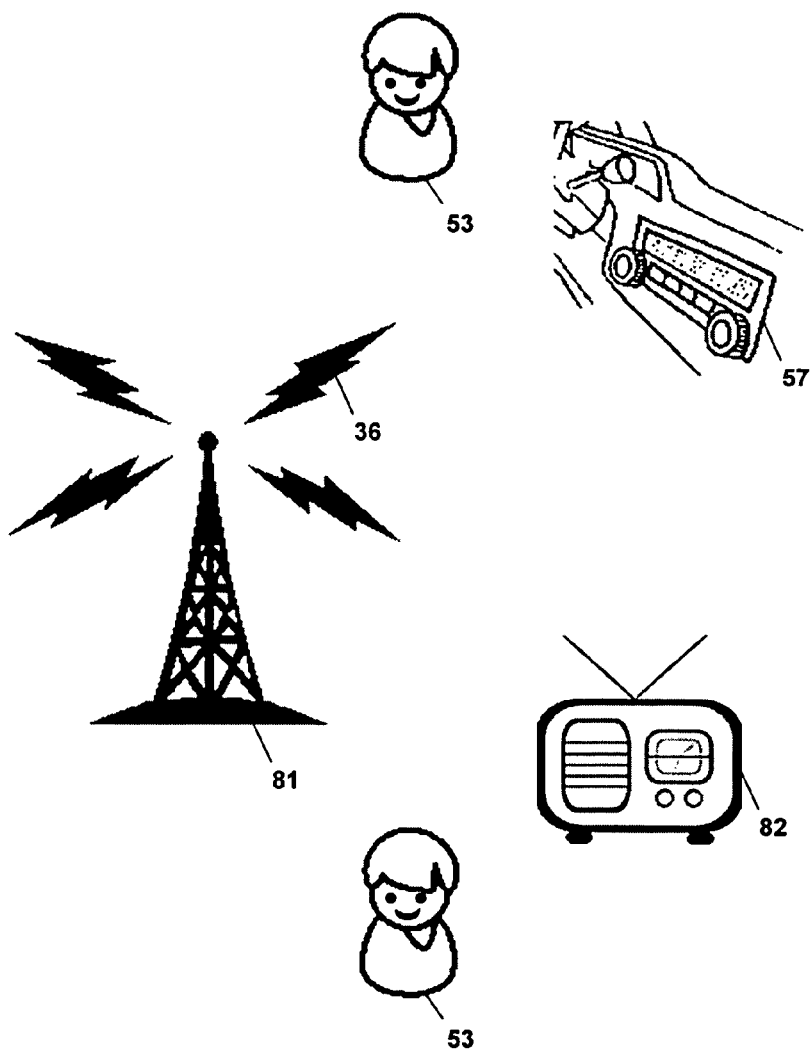
FIG. 6 shows a prior art scenario in which a user listens to radio while driving or stationary.

FIG. 6 shows a prior art scenario in which a user 53 listens to radio while driving or stationary. Broadcast radio signals 36 are sent from broadcast radio station tower 81 and received in broadcast radio signal receiver 50 in automobile radio 57 or in portable radio 82. User 53 then tunes radio and listens to desired radio channel 60.

Figure 7:
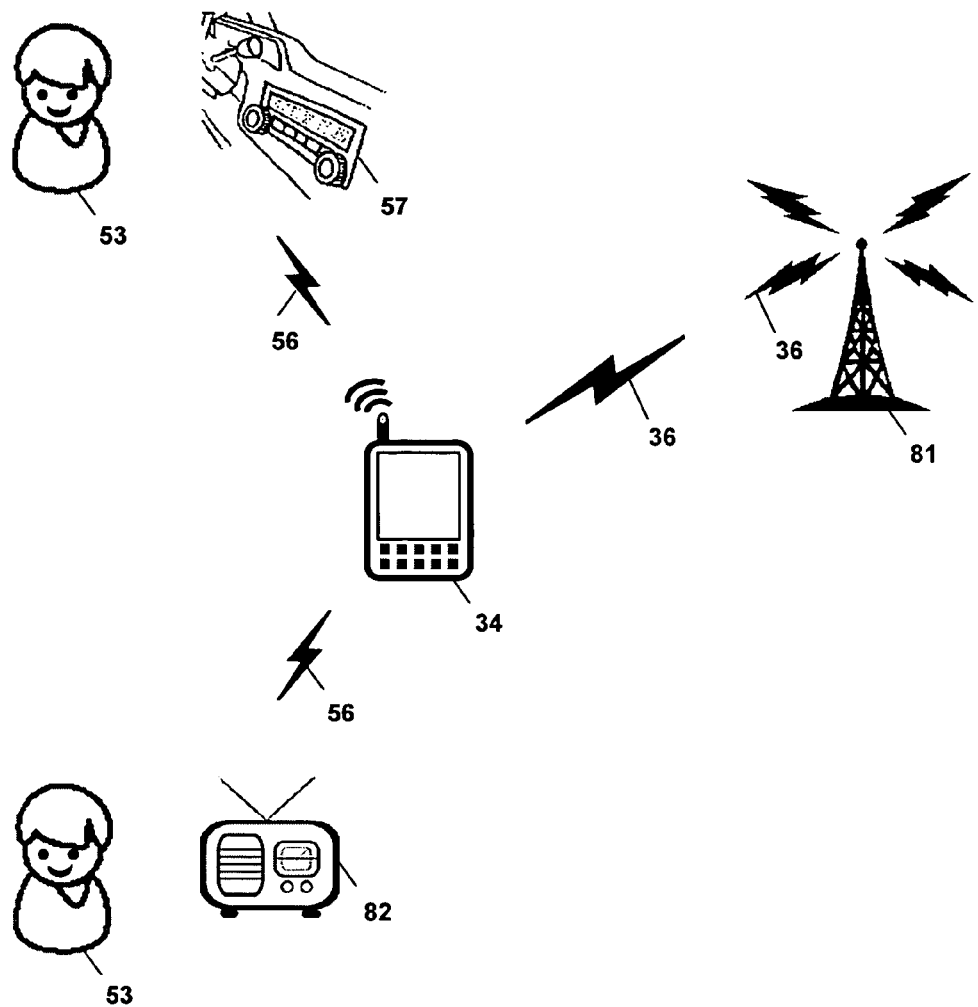
FIG. 7 shows a use case of present invention where a user can listen to a radio using a smartphone by intercepting radio broadcast signals and combining with output of software applications.

FIG. 7 shows a use case of present invention where a user 53 can interact with an automobile radio 57 or portable radio 82 by using smartphone 34. Broadcast radio signals 36 sent from broadcast radio station tower 81 are intercepted by smartphone 34 and then combined with output of software applications 54 to produce combined digital audio content 55. Broadcast radio signal transmitter 47 located in smartphone 34 receives combined digital audio content 55 and produces combined radio broadcast signal 56 that is transmitted to automobile radio broadcast receiver 83 located in automobile radio 57 or portable radio 82. Transmission of combined radio broadcast signal 56 is done on a different radio broadcast frequency with low power signal.

Figure 8:
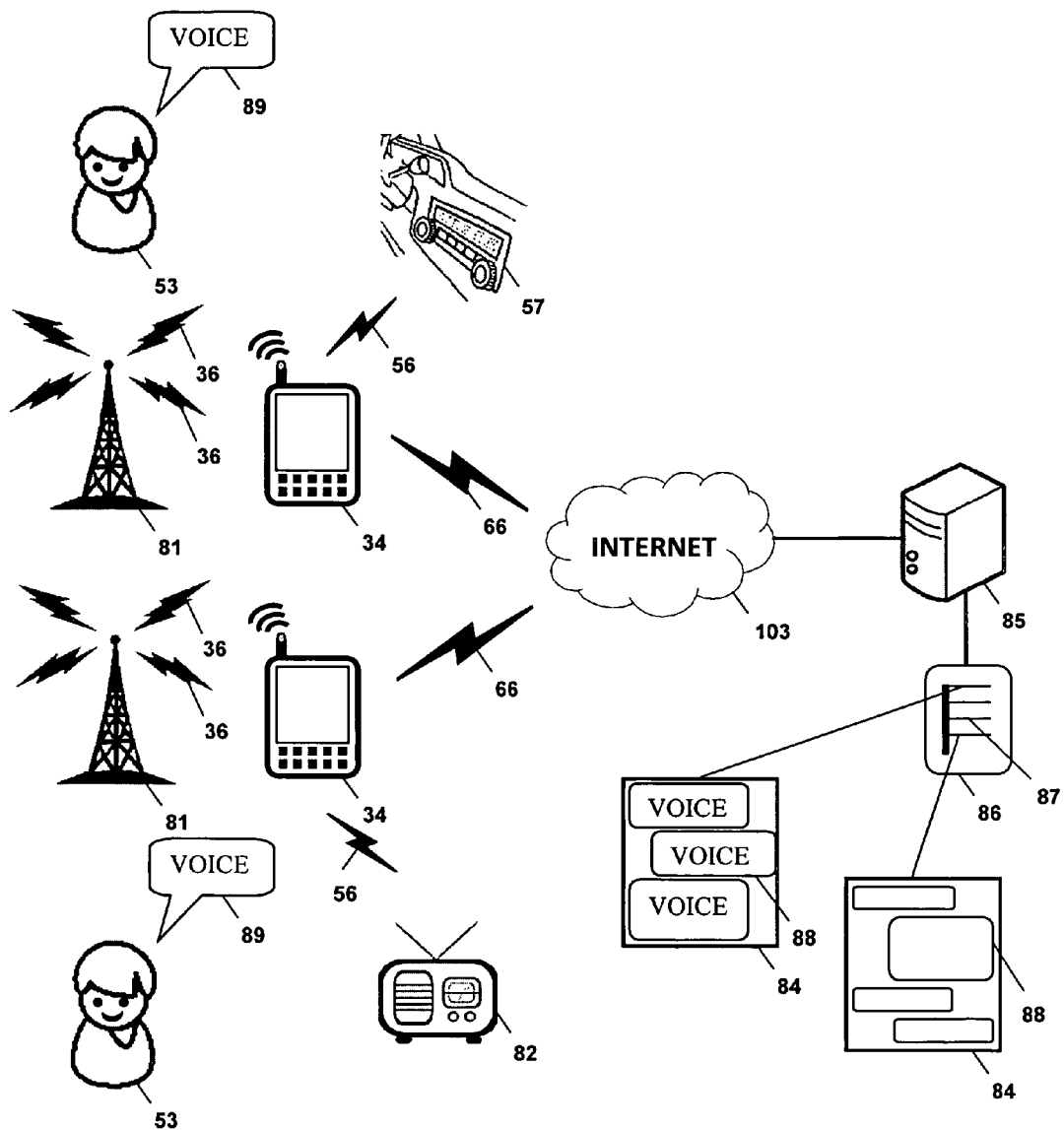
FIG. 8 shows a use case of present invention where a user joins audio content based voice chat rooms based on time and channel information.

FIG. 8 shows a use case of present invention where a user 53 joins audio content based voice chat rooms 84 determined by time of broadcast and radio channel 60 selected. Voice chat rooms 84 are created by voice chat room server 85 connected to internet. Voice chat room server 85 manages several chat sessions with chat lists 86 that contain several chat room entries 87. Each chat room entries 87 consist of chat room dialogs 88 that record and store user conversations 89 based on time of broadcast and radio channel 60 selected.

User conversations 89 are distributed to all users 53 joined in chat session using either a circuit switched or data call. Chat room dialogs 88 can also be retrieved by user 53 at a later point in time.

Figure 9:
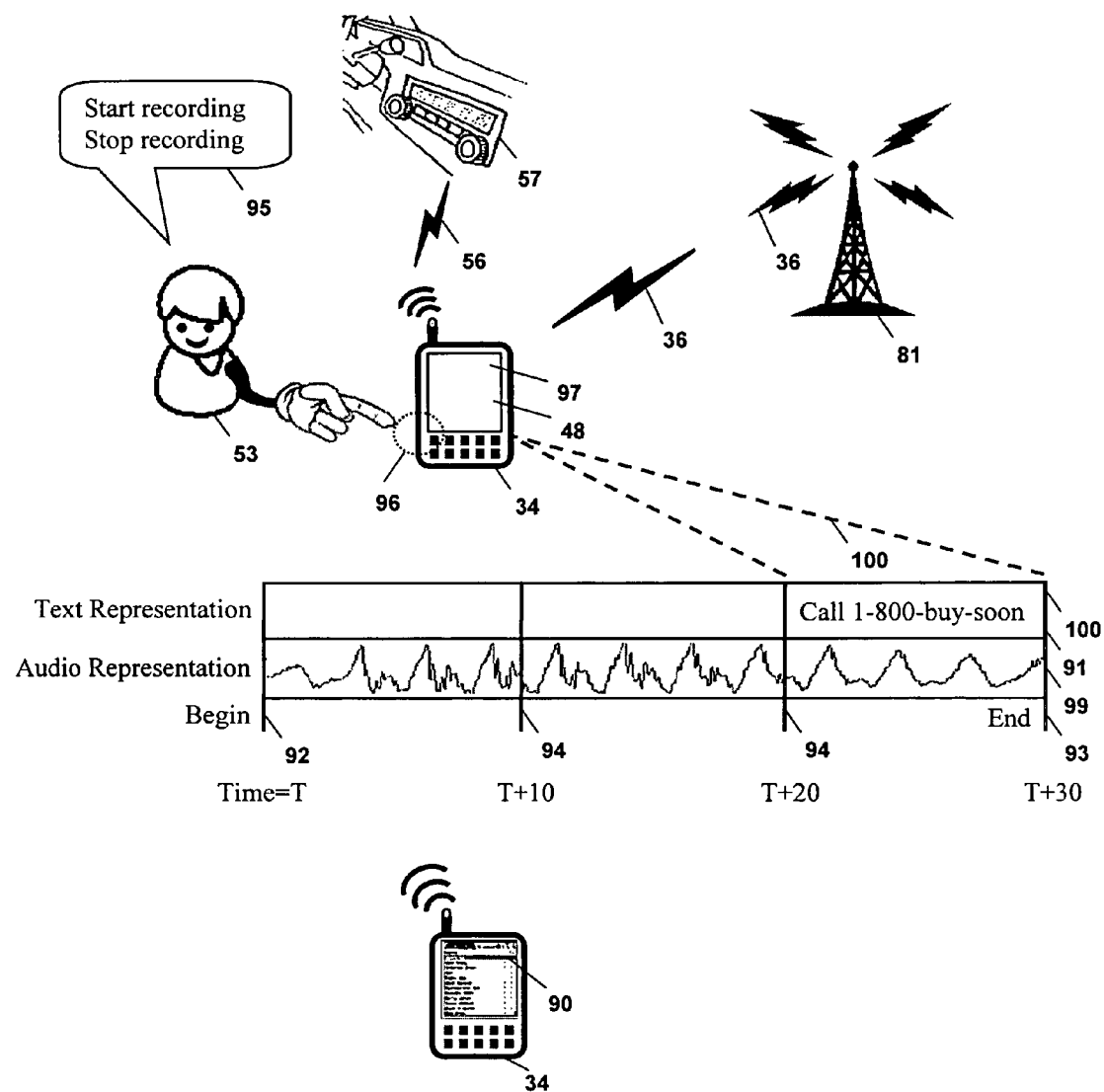
FIG. 9 shows a use case of present invention where a user saves phone numbers from radio advertisements into mobile phone.

FIG. 9 shows a use case of present invention where a user 53 saves phone numbers 90 into smartphone 34 after listening to radio advertisement 91 in automobile radio 57 or portable radio 82. In further descriptions, automobile radio 57 shall represent both automobile radio 57 and portable radio 82.

User 53 starts listening to radio channel 60 at the beginning of time interval 92 and stops listening at end of time interval 93. Begin time interval 92 and end time interval 93 can be further divided into time intervals 94 within which a radio advertisement 91 is played. When user 53 listens to radio advertisement 91, user 53 has the option of issuing a voice command 95 or pressing keypad button 96 on smartphone 34 to start recording radio advertisement 91. Once recording is complete, user 53 has the option of issuing a voice command 95 or pressing the record button 97 on smartphone 34 to stop recording radio advertisement 91. On receiving voice command 95 to stop recording, an optional automatic speech recognition engine 98 and software applications 48 in smartphone 34 convert recorded audio representation 99 into textual representation 100 which is then stored in smartphone 34 as phone number 90. Instead of storing phone number 90 as a textual representation 100, user 53 also has the option to store snippet of audio content of radio advertisement 91 that contains advertisers phone number 90.

Ability to store phone number heard in radio advertisement, benefits user 53 as well as radio broadcasters and advertisers. User 53 is now able to immediately initiate phone call without having to remember or write down the number while driving. Apart from obvious convenience of storing phone numbers 90 with ease, this also improves safety when driving. Radio broadcasters and advertisers also benefit by being able to keep track and maximize their advertisement dollars from potential customers.

Figure 10:
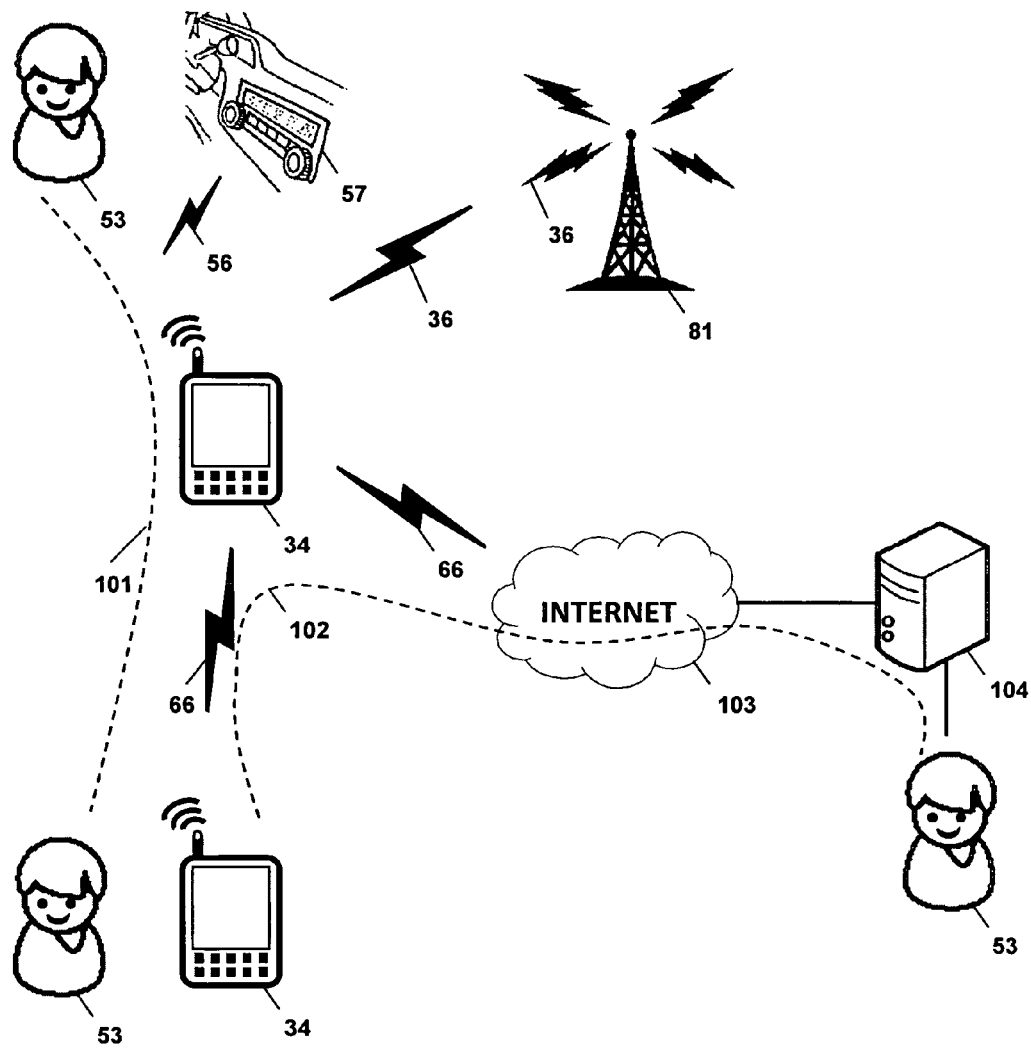
FIG. 10 shows a use case of present invention where a user listens to audio content together with other users by routing audio content from broadcast radio into a phone call or internet Voice over Internet Protocol (VoIP) call.

FIG. 10 shows a use case of present invention where a user 53 listens to audio content together with other users by routing audio content from broadcast radio into a circuit switched phone call 101 or Voice over Internet Protocol (VoIP) call 102. User 53 tunes to a particular radio channel 60 and receives broadcast radio signals 36 using smartphone 34. Smartphone 34 also simultaneously establishes phone call with other users using cellular network 66 or internet 103. During phone call, smartphone 34, routes broadcast audio content into established call apart from transmitting it locally, using cellular network 66 or internet 103. This use case of current invention enables group of users in a phone call to share and listen to same broadcast audio content. Sharing audio content using this routing technique provides a much clearer audio sharing experience as compared to picking up audio content from microphone of smartphone 34. Audio sharing can also be used as background music as part of audio conversation between users.

Figure 11:
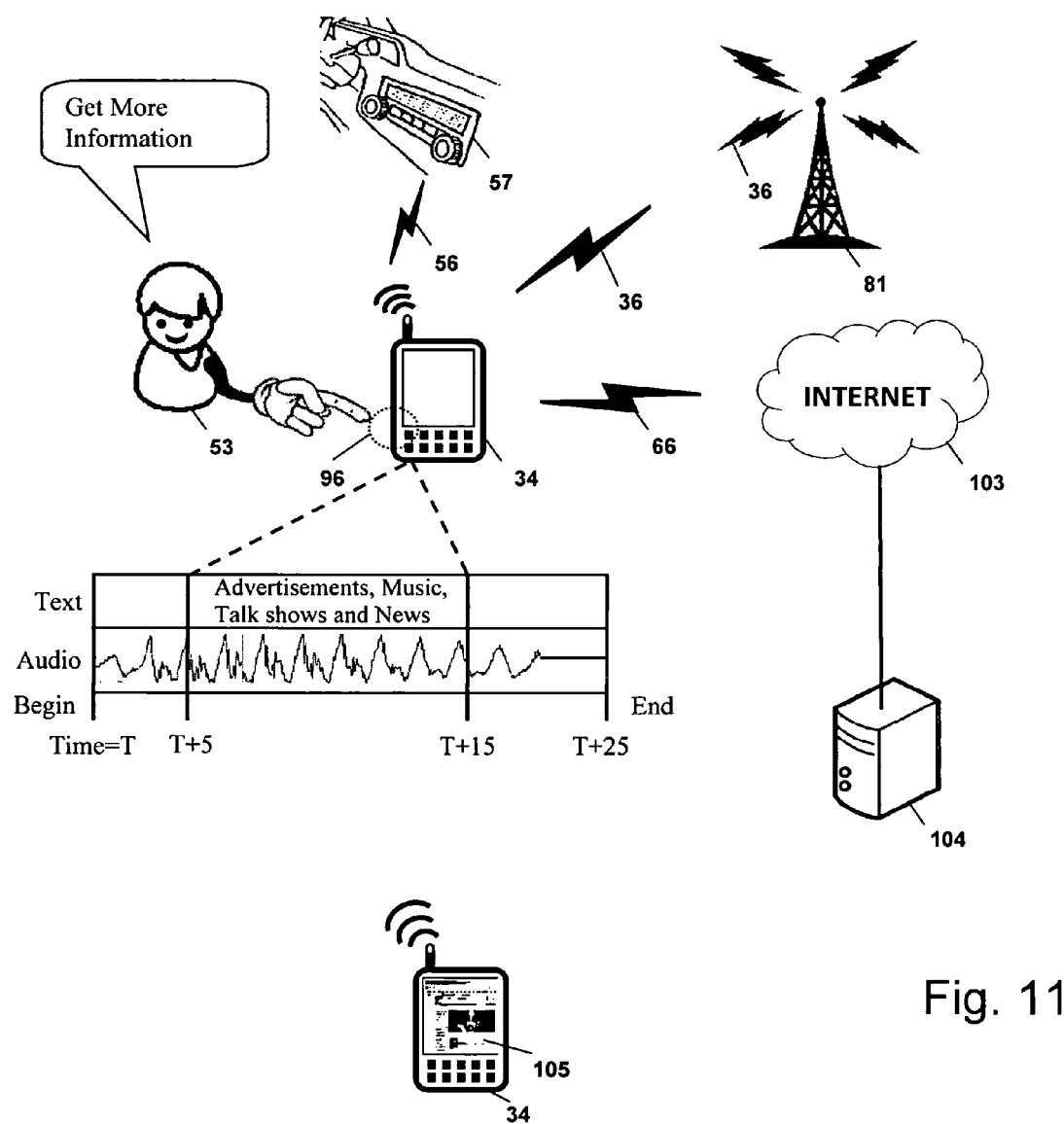
FIG. 11 shows a use case of present invention where a user requests additional information from audio content provider related to audio content heard over broadcast radio.

FIG. 11 shows a use case of present invention where user 53 requests additional information from audio content provider related to audio content heard over broadcast radio. Smartphone 34 receives broadcast radio signals 36 and tunes to a specific radio channel 60 for receiving broadcast audio content. When audio content such as advertisements, talk shows, news and music are broadcast between time any time interval such as T seconds and time T+25 seconds, user 53 presses a button 96 of smartphone 34 to request additional information specific to audio program heard by user 53. Then smartphone 34 sends this request to content server 104 using internet 103 with time of audio broadcast and radio channel 60 information. Content server 104 maintains additional information regarding audio content played in radio channel 60, organized based on radio channel 60 and time of broadcast. After receiving request for additional information from smart phone 34, content server 104 responds with audio information that is played back in smartphone 34 and optionally graphical and textual information to be displayed in internet browser 105 of smartphone 34.

Figure 12:
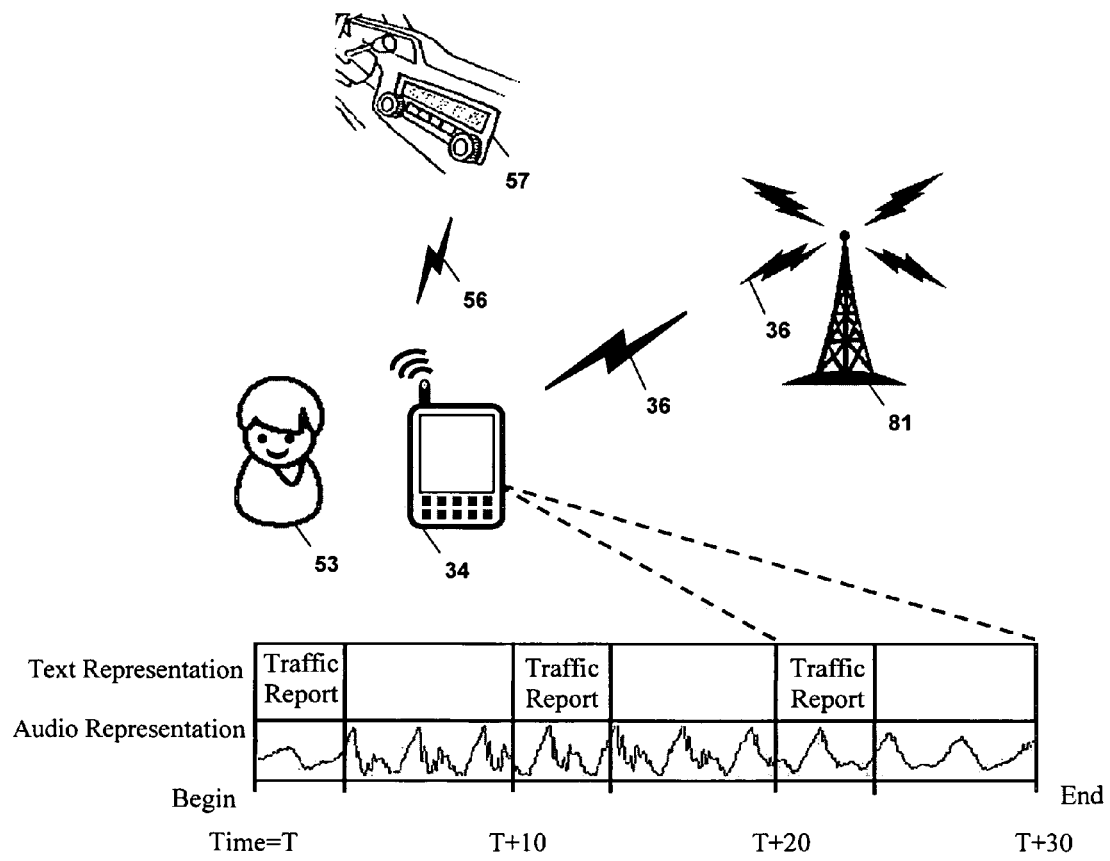
FIG. 12 shows a use case of present invention where a user sets a mobile device to record all traffic broadcast signals at periodic intervals so as to provide the latest traffic update to user getting into an automobile.

FIG. 12 shows a use case of present invention where user 53 sets smartphone 34 to record all traffic broadcast signals 36 at periodic intervals so as to provide the latest traffic update to user 53 getting into a car. There are several commercial broadcast stations in United States and around the world that report road traffic information on periodic basis, usually at every 10 to 15 minute time intervals. But traffic information may not be available when user is ready to drive and it may adversely impact route selection. According to this invention, radio channel 60 transmits traffic reports at time T, T+10, T+20 for preset amount of time. Smartphone 34 is programmed to tune to radio channel 60 at specified time intervals T, T+10, T+20 and record traffic report for preset amount of time. User 53 is able to play any of the recorded traffic report as soon as user enters car, so that user 53 can determine most optimum route without having to wait for next traffic report. This is performed by user 53 by pressing a keyboard button of smartphone 34 and recorded traffic report is played as combined radio broadcast signal 56 and subsequently heard in automobile radio 57.

Figure 13:
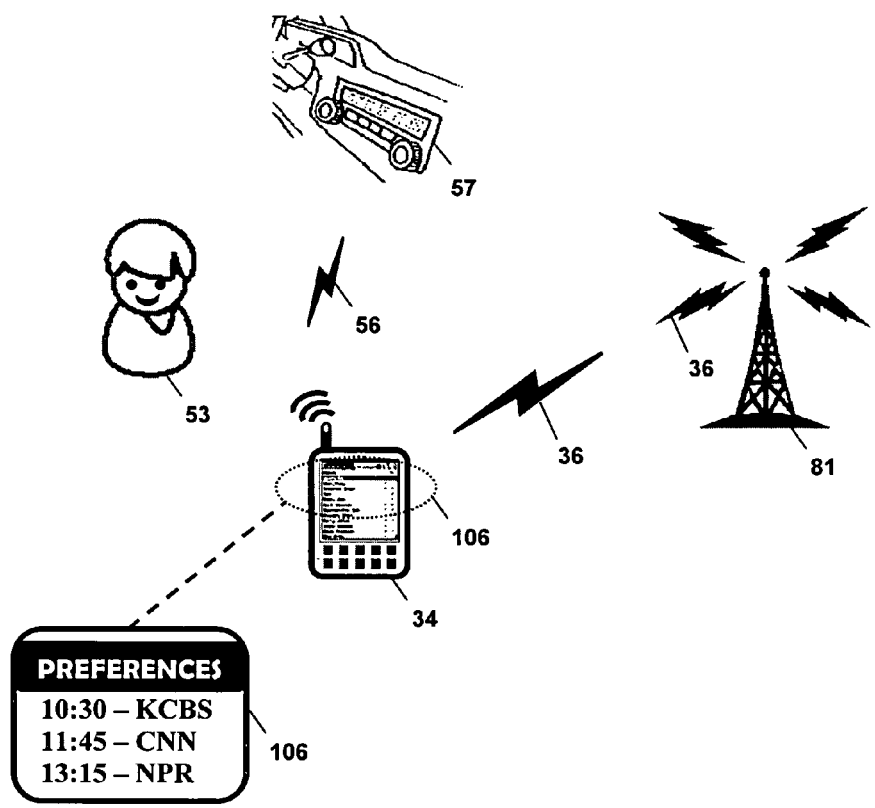
FIG. 13 shows a use case of present invention where a user sets preferences on mobile device to automatically switch radio channels based on user preferences.

FIG. 13 shows a use case of present invention where user 53 can create a preference list 106 on smartphone 34 to automatically tune to broadcast radio channels 60 at preset times. Tuned radio channels 60 are then transmitted from smartphone 34 as combined radio broadcast signal 56 to automobile radio 57. This invention enables user 53 to automatically listen to different radio channels 60 at different times based on preference list 106 without having to manually tune to radio channels while driving an automobile.

Figure 14:
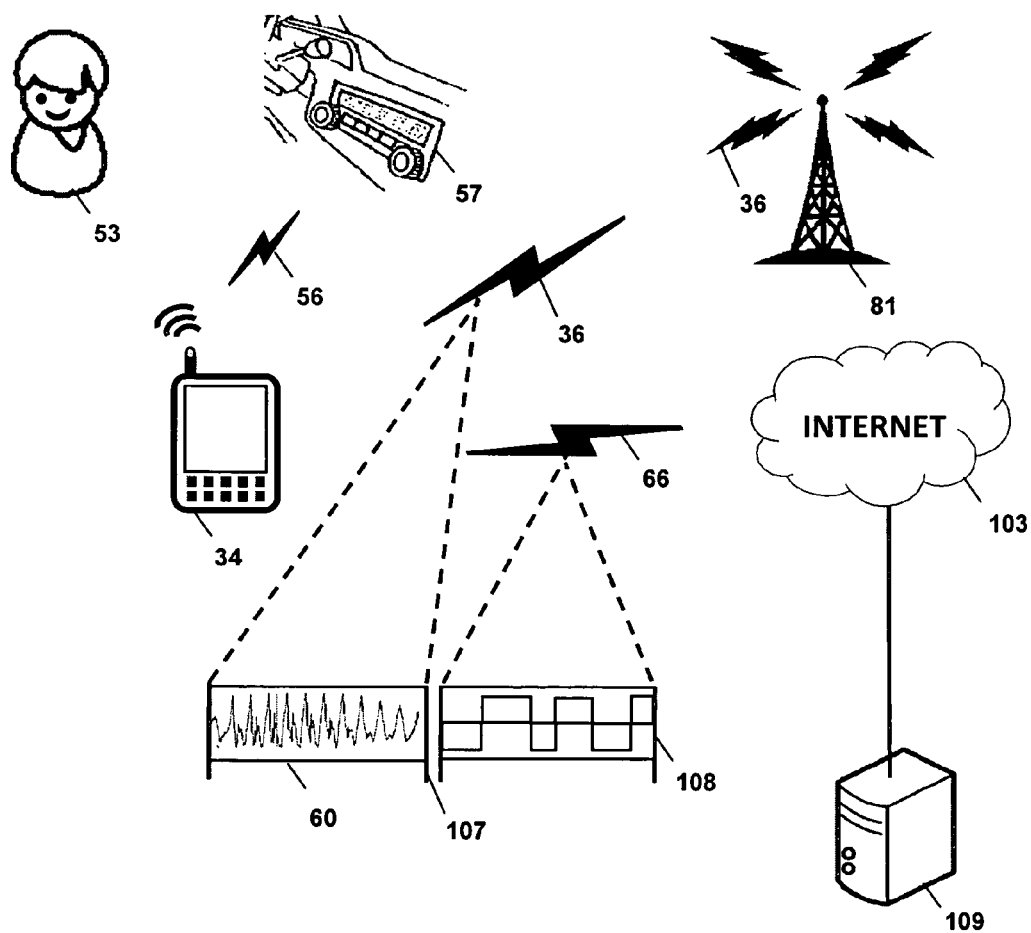
FIG. 14 shows a use case of present invention where a mobile device detects end of a radio broadcast program and automatically retrieves and plays audio blogs related to audio content from broadcast radio.

FIG. 14 shows a use case of present invention where smartphone 34 detects end of radio broadcast program 107 and automatically retrieves and plays audio blogs 108 related to audio content from blog server 109. According to this invention, audio blog server 109 maintains audio blogs 108 that are grouped based on audio programs that are broadcast on radio channels 60. Also according to this invention, smartphone 34 is programmed to identify end of radio broadcast program 107 and automatically communicate with audio blog server 109 over internet 103 to receive audio blogs 108 related to audio program. Audio blog 108 is transmitted as combined radio broadcast signal 56 by smartphone 34 and to be played in automobile radio 57.

Figure 15:
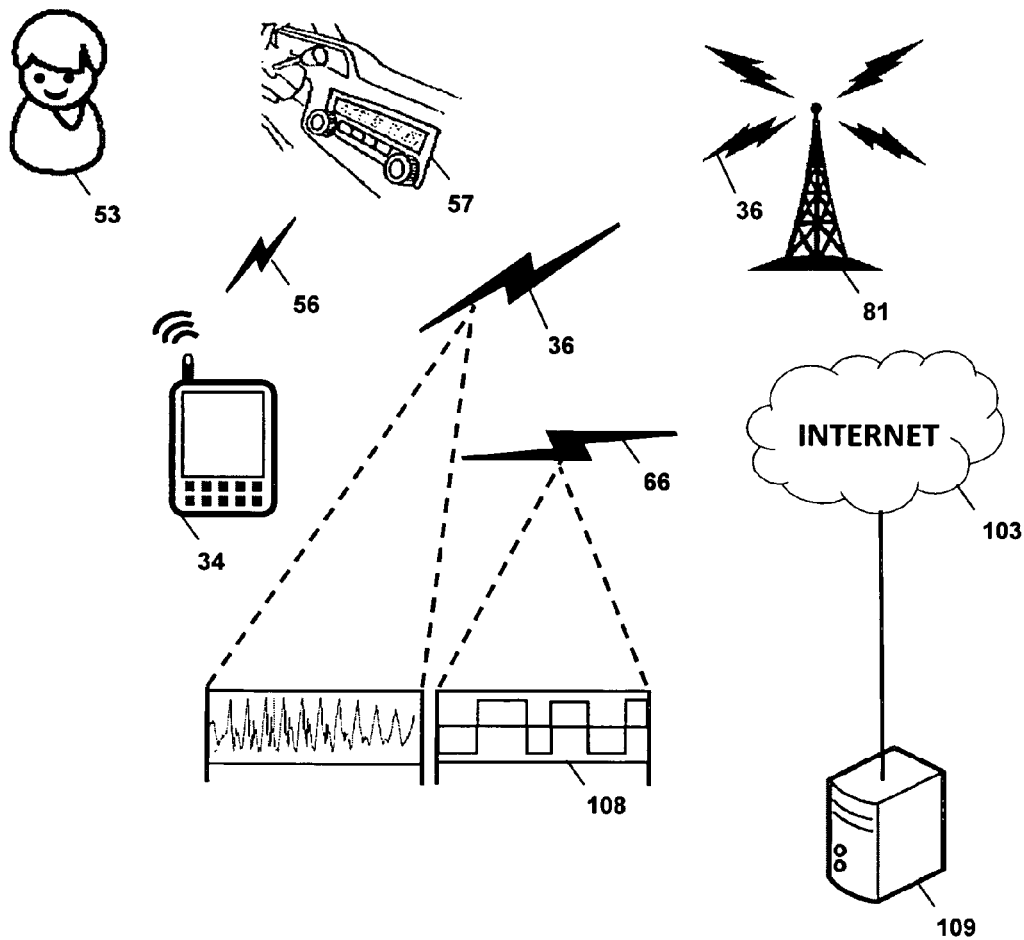
FIG. 15 shows a use case of present invention where a mobile device allows user to record audio blogs related to audio content in broadcast radio signal and publish to an audio blog website.

FIG. 15 shows a use case of present invention where smartphone 34 allows user 53 to record comments related to audio content from broadcast radio to an audio blog website. According to this invention, audio blog server 109 maintains audio blogs 108 that are grouped based on audio programs that are broadcast over radio channel 60. Also according to this invention, smartphone 34 is programmed to communicate with audio blog server 109 through internet 103 upon user request. When radio channel 60 is played in automobile radio 57, user 53 activates certain keystrokes in smartphone 34 to initiate recording of user opinion regarding audio program which is then transferred to audio blog server 109 using internet 103.

Figure 16:
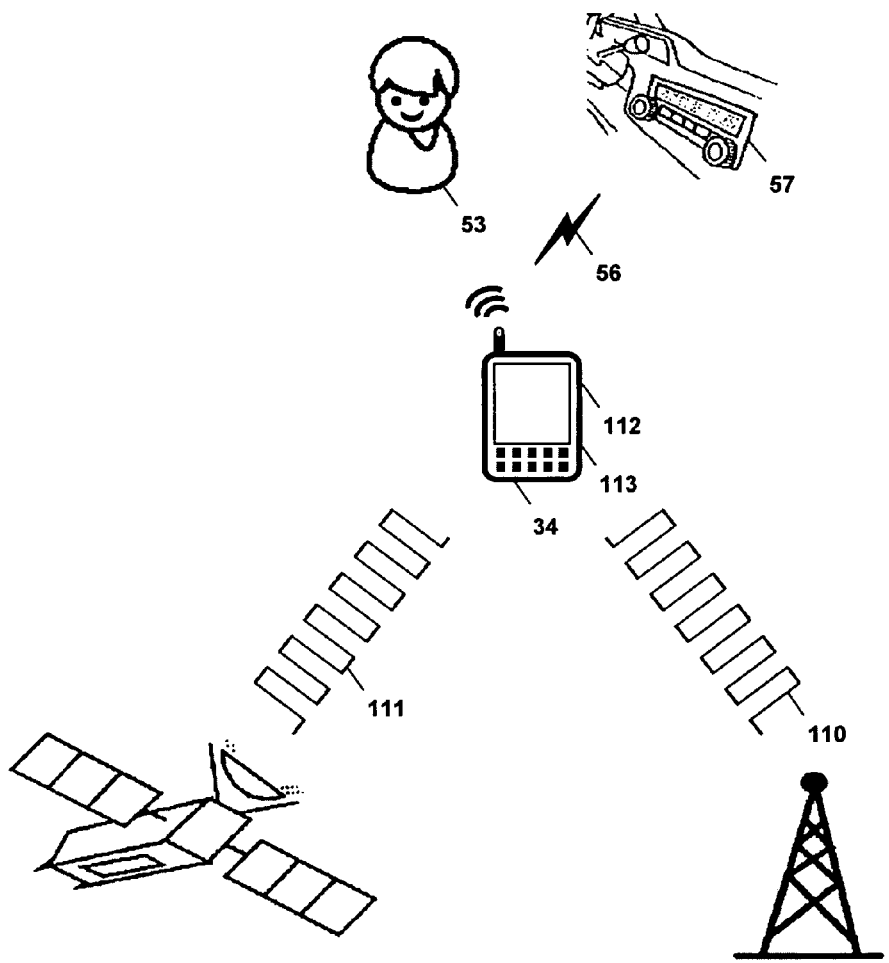
FIG. 16 shows a use case of present invention where Digital radio and Satellite radio stations are enabled in an automobile that does not have Digital radio and Satellite radio station receivers.

FIG. 16 shows a use case of present invention where Digital radio stations and Satellite radio stations are made available in a regular radio receivers. Most of existing automobiles radios 57 are not equipped to receive digital radio broadcast signals 110 and satellite radio broadcast signals 111. According to this invention, smartphone 34 is optionally equipped with satellite radio receiver 112 and digital radio receiver 113. Smartphone 34 tunes to satellite radio or digital radio broadcast and receives audio programs through digital radio broadcast signals 110 or satellite radio broadcast signals 111. Smartphone 34 then transmits received digital radio broadcast signals 110 or satellite radio broadcast signals 111 as combined radio broadcast signal 56.

Automobile radio 57 tunes to combined radio broadcast signal 56 and receives audio programs that were received by smartphone 34 from satellite radio broadcast or digital radio broadcast.

Figure 17:
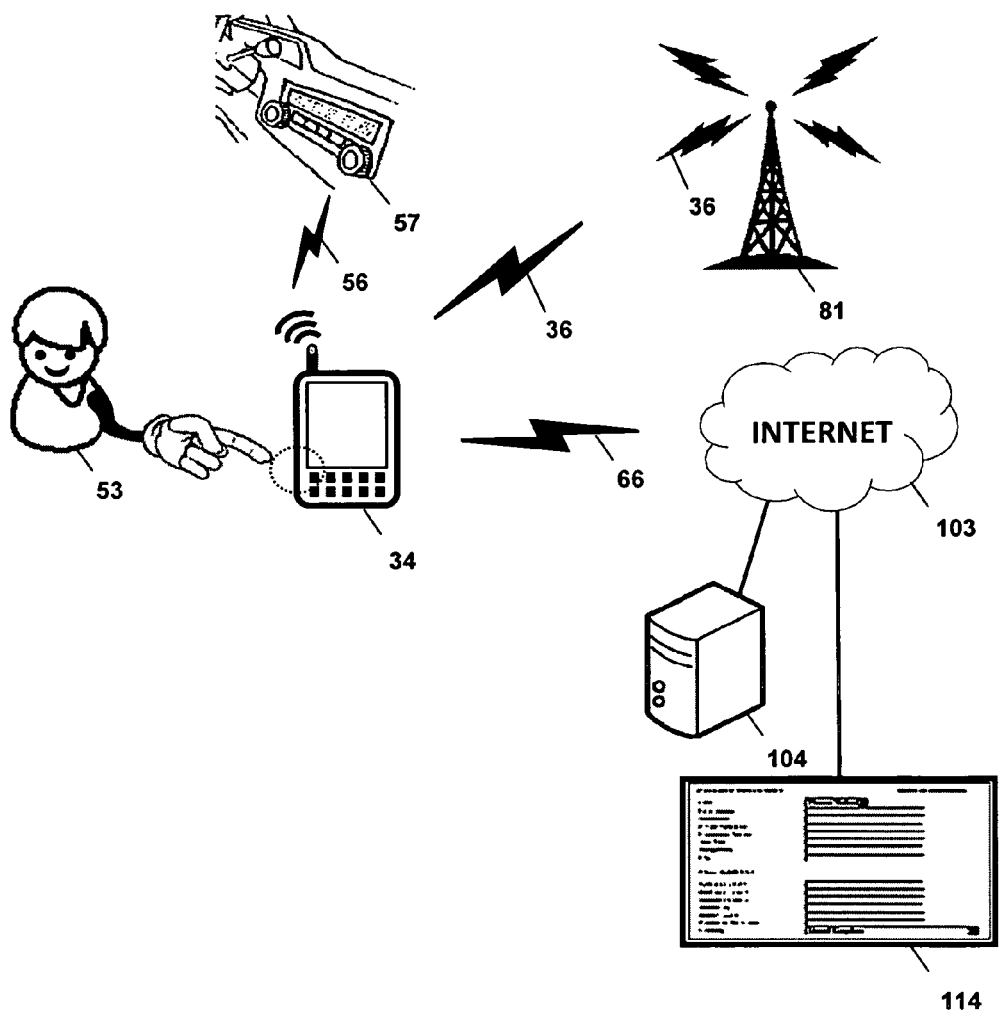
FIG. 17 shows a use case of present invention where a user listens to radio broadcast music and is able to purchase the same music for future use from an internet music store.

FIG. 17 shows a use case of present invention where user 53 listens to music from radio broadcast and is able to purchase the same music from an internet music store. Smartphone 34 is tuned to radio channel 60 and automobile radio 57 tunes to combined radio broadcast signal 56 to listen to same radio channel 60. User 53 listening to FM quality music program heard in automobile radio 57 may want to purchase same music program for future listening but may prefer higher quality digital version of same music. FM quality music is normally 92 kbps and higher quality digital version of same music can be 128 kbps or higher. According to this invention, content server 104 organizes high quality digital versions of music and audio program broadcast in various radio channels 60 based on time and channel number of radio channel 60. Also according to this invention, smartphone 34 is programmed to support certain key sequences that enable smartphone 34 to send request to content server 104 with radio channel 60 information and time of broadcast to download high quality digital version of music and audio program heard on radio channel 60. User 53 activates appropriate key sequence in smartphone 34 when desired audio program is played in automobile radio 57 to download high quality digital version of music and audio program into smartphone 34 from content server 104. Also according to this invention, content server 104 is provided with credit card details of user 53 so that cost of high quality digital version of music and audio program is automatically charged to credit card before download. User 53 can enter credit card information using a browser at the website of radio station 114.

Figure 18:
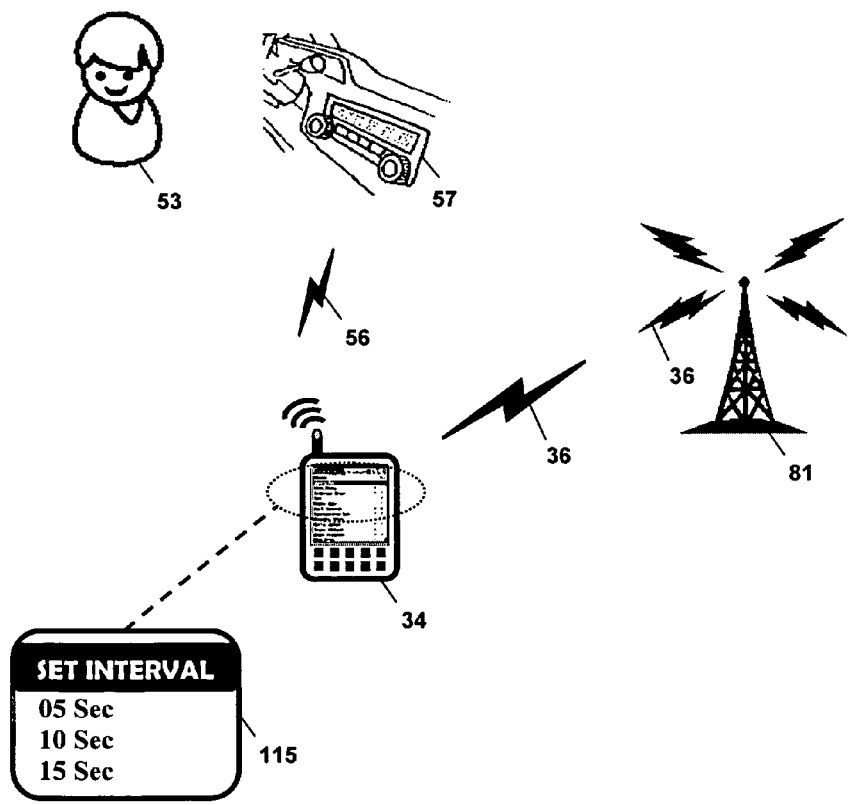
FIG. 18 shows a use case of present invention where a user has the ability to record broadcast music tracks without missing early parts of the broadcast.

FIG. 18 shows a use case of present invention where user 53 has the ability to record the whole songs with preset time buffer intervals that enable user reaction time to start recording and not miss the early part of the music. Smartphone 34 is tuned to radio channel 60 and automobile radio 57 tunes to combined radio broadcast signal 56 to listen to same radio channel 60. User 53 listening to music program heard on automobile radio 57 may want to record program to play at later time.

In certain instances, user 53 listening to music program may want to record music when music program is already in progress and hence by initiating recording at that time, complete music program will not be recorded. According to this invention, smartphone 34 is programmed to automatically prerecord certain number of seconds after start of any music program so when user 53 activates certain key strokes to initiate recording of ongoing music program, complete recording of music program is made possible by making use of automatically prerecorded portion of music. The recording time intervals 115 can be set on smartphone 34. The beginning of each music track can be recognized by other means.

Figure 19:
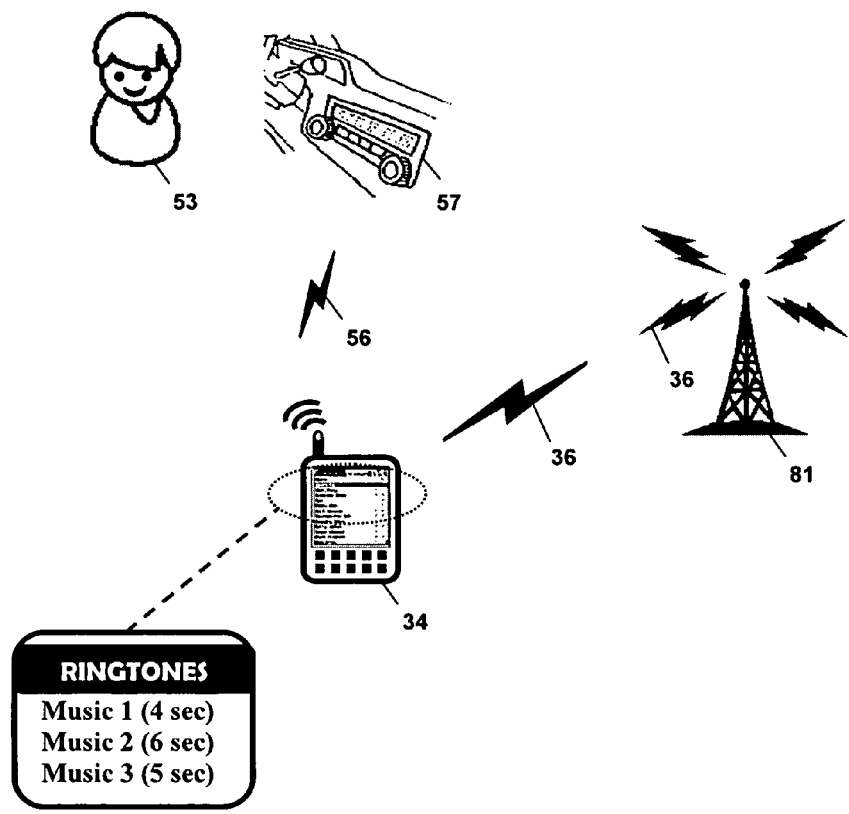
FIG. 19 shows a use case of present invention where a user saves broadcast audio content as ringtones for smartphone.

FIG. 19 shows a use case of present invention where user 53 saves broadcast radio songs as ringtones for smartphone 34. Smartphone 34 is tuned to radio channel 60 and automobile radio 57 tunes to combined radio broadcast signal 56 to listen to same radio channel 60. User 53 listening to music program heard on automobile radio 57 may want to record music program to be used as ring tone. According to this invention, smartphone 34 is programmed to record music program that is received in radio channel 60 to be stored in smartphone 34 as ring tone. User 53 listening to music on automobile radio 57, can activate appropriate key strokes in smartphone 34 to store music as ring tone.

Figure 20:
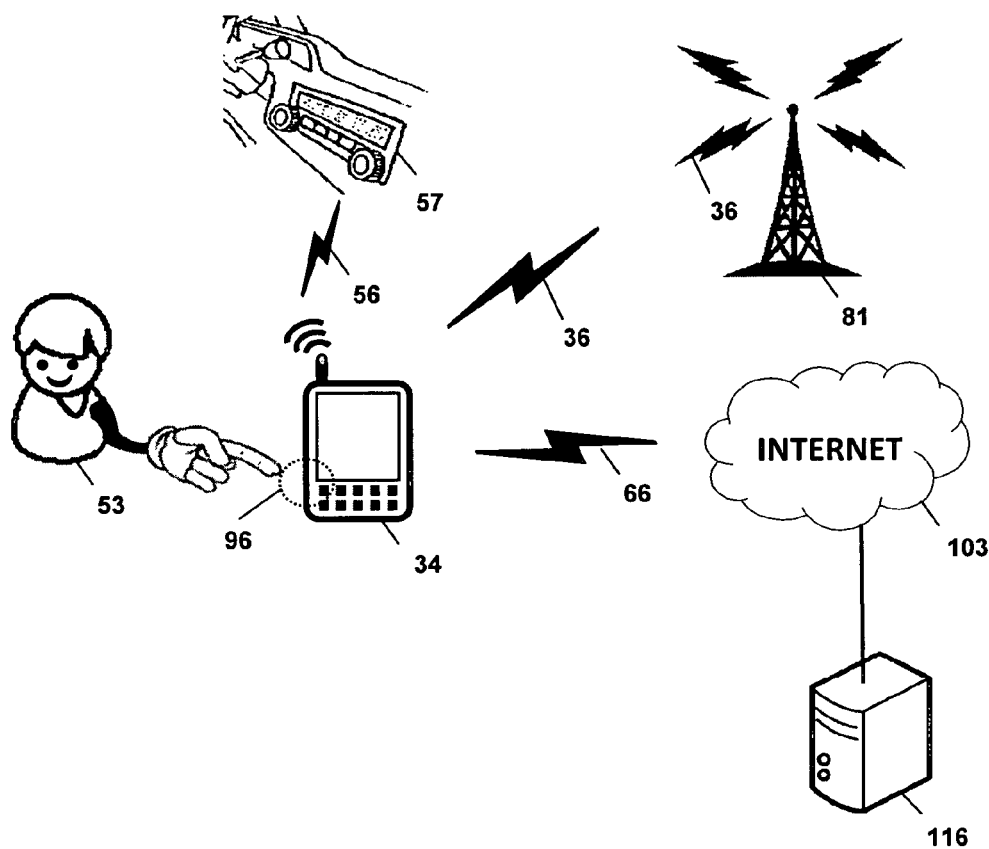
FIG. 20 shows a use case of present invention where a user listens to advertisement and sends request from smartphone to an advertisement server for coupons related to product advertised.
Figure 20:
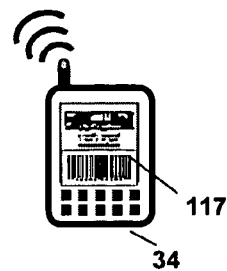

FIG. 20 shows a use case of present invention where user 53 requests coupons from the advertiser website related to an advertisement heard over broadcast radio. Smartphone 34 receiving broadcast radio signals 36 tunes to a specific radio channel 60 for receiving broadcast audio content. Smartphone 34 then transmits combined radio broadcast signal 56 to automobile radio 57. When advertisement is heard by user 53 who presses a keypad button 96 of smartphone 34, request is sent to advertisement server 116 using internet 103. Advertisement server 116 responds with coupon 117 that is dispatched to smartphone 34. Coupon 117 is copied into smartphone 34 and added to a coupon list. When user 53 moves away from automobile radio 57, coupon 117 from coupon list can be recalled on smartphone 34 and used is stores while shopping.

ADVANTAGES

From the description above a number of advantages of this interactive radio system become evident:
a) an interactive radio system is provided that works in any automobile;
b) an interactive radio system is provided that enables a user to have access to broadcast audio content in a mobile phone and enhance the content if necessary and then transfer such enhanced content from the mobile phone into the audio system of an automobile in real time; and
c) an interactive radio system is provided, that enables use of mobile device software to interact with audio content.

CONCLUSION, RAMIFICATIONS AND SCOPE

Accordingly, the reader will see that combining a mobile device capable of running software applications to interact with broadcast audio content, with the capability to simultaneously receive and transmit radio signals provides an interactive radio system that can be used in any automobile.

Although the description above contains many specificities, these should not be construed as limiting the scope of invention but merely as providing illustrations of some of the presently preferred embodiments of this invention. Thus the scope of this invention should be determined by appended claims and their legal equivalents, rather than by example given.

We claim:

1. A method of providing an interactive radio system using a mobile device comprising:
    a) receiving a first radio broadcast signal by tuning to a corresponding channel in the receiver tuner of said mobile device, wherein said first radio broadcast signal is selected from group consisting of analog radio broadcast signal, and digital radio broadcast signal;
    b) extracting audio content from said first radio broadcast signal into said mobile device;
    c) converting said audio content associated with said first radio broadcast signal into intermediate digital audio content in intermediate digital audio content format such that said intermediate digital audio content can be combined with digital audio output of software applications executing at said mobile device;
    d) executing said software applications to produce said digital audio output;
    e) capturing said digital audio output of said software applications;
    f) combining said digital audio output and said intermediate digital audio content to produce a first combined signal that can be received by a radio receiver; and
    g) transmitting said first combined signal using a transmitter tuner of said mobile device as a second radio broadcast signal, wherein said second radio broadcast signal is selected from group consisting of analog radio broadcast signal, and digital radio broadcast signal.

2. The method to provide an interactive radio system using a mobile device of claim 1, wherein said analog radio broadcast signal is compatible with a standard selected from group consisting of amplitude modulation standard, and frequency modulation standard.

3. The method to provide an interactive radio system using a mobile device of claim 1, wherein said digital radio broadcast signal is compatible with a standard selected from group consisting of high definition radio standard, and digital audio broadcasting standard.

4. The method to provide an interactive radio system using a mobile device of claim 1, wherein said digital audio output from software applications is comprised of audio excerpt selected from group consisting of audio prompt for user input, internet based audio content related to said audio content, audio information from phone applications executed in said mobile device, and location information from embedded global positioning receiver in said mobile device.

5. The method to provide an interactive radio system using a mobile device of claim 1, wherein said mobile device is selected from group consisting of personal digital assistant, mobile phone, smartphone and, portable media player capable of receiving said first radio signal and transmitting said second radio signal to a radio in simultaneously and in real time.

6. The method to provide an interactive radio system using a mobile device of claim 1, further comprising:
    a) receiving input from a user into said software applications for said interaction with said intermediate digital audio content;
    b) capturing digital audio output related to said input from said software applications, further referred to as user related digital audio output;
    c) combining said user related digital audio output with said first combined signal to produce a second combined signal that can be received by a radio receiver; and
    d) transmitting said second combined signal to said radio receiver to enable a user to listen and interact with said second combined signal comprising said intermediate digital audio content, said digital audio output of said software applications and said user related digital audio output.

7. A mobile device providing an interactive radio system comprising:
   a) a receiver tuner for receiving a first radio broadcast signal as input wherein said radio broadcast signal is selected from group consisting of analog radio broadcast signal, and digital radio broadcast signal;
   b) a decoder module to decode audio content from said first radio broadcast signal into said mobile device;
   c) conversion module for converting said audio content associated with said first radio broadcast signal into a intermediate digital audio content in intermediate digital audio content format such that said intermediate digital audio content can be combined with digital audio output of software applications running at said mobile device;
   d) combining module for combining said digital audio output of said software applications and said intermediate digital audio content to produce a first combined signal;
   e) a encoder module to encode said first combined signal into a second radio broadcast signal from said mobile device; and
   f) a transmitter tuner to transmit said first combined signal using said transmitter tuner of said mobile device, wherein said second radio broadcast signal is selected from group consisting of analog radio broadcast signal, and digital radio broadcast signal.

8. The mobile device providing an interactive radio system of claim 7, wherein said analog radio broadcast signal is compatible with a standard selected from group consisting of amplitude modulation, standard and frequency modulation standard.

9. The mobile device providing an interactive radio system of claim 7, wherein said digital radio broadcast signal is compatible with a standard selected from group consisting of high definition radio standard, and digital audio broadcasting standard.

10. The mobile device providing an interactive radio system of claim 7, wherein said mobile device is selected from group consisting of personal digital assistant, mobile phone, smartphone and portable media player capable of receiving said radio signals and transmitting radio signals simultaneously and in real time.

11. The mobile device providing an interactive radio system of claim 7, further comprising:
   a) a user input receiving module to receive input from a user into said software applications for interaction with said intermediate digital audio content;
   b) a output capturing module to capture digital audio output related to said input from said software applications further referred to as user related digital audio output.

12. A silicon chip comprising:
   a) a receiver tuner for receiving a first radio broadcast signal as input wherein said radio broadcast signal is selected from group consisting of analog radio broadcast signal, and digital radio broadcast signal;
   b) a audio input module to receive audio input from external components wherein said audio input is passed in using a signal selected from group consisting of analog audio input signal and digital audio input signal;
   c) a audio combining module to combine said audio input signal and audio content in said first radio broadcast signal to generate a combined radio signal that can be transmitted using said transmitter in said second broadcast radio signal; and
   d) a transmitter tuner to simultaneously transmit a second radio broadcast signal using said transmitter tuner of said mobile device, wherein said second radio broadcast signal is selected from group consisting of analog radio broadcast signal, and digital radio broadcast signal.

13. The silicon chip of claim 12, wherein said analog radio broadcast signal is compatible with a standard selected from group consisting of amplitude modulation standard, and frequency modulation standard.

14. The silicon chip of claim 12, wherein said digital radio broadcast signal is compatible with a standard selected from group consisting of high definition radio standard, and digital audio broadcasting standard.

* * * * *